(12) United States Patent
Sudo et al.

(10) Patent No.: US 7,404,998 B2
(45) Date of Patent: Jul. 29, 2008

(54) SYNTHETIC RESIN CARD AND METHOD OF PRODUCING THE SAME

(75) Inventors: Miki Sudo, Miyagi (JP); Eiji Ohta, Miyagi (JP); Shinichi Matsumura, Miyagi (JP)

(73) Assignee: Sony Corporation, Tokyo (JP)

( * ) Notice: Subject to any disclaimer, the term of this patent is extended or adjusted under 35 U.S.C. 154(b) by 183 days.

(21) Appl. No.: 10/560,445

(22) PCT Filed: Jun. 23, 2004

(86) PCT No.: PCT/JP2004/009237

§ 371 (c)(1),
(2), (4) Date: Dec. 13, 2005

(87) PCT Pub. No.: WO2004/113069

PCT Pub. Date: Dec. 29, 2004

(65) Prior Publication Data

US 2006/0141227 A1 Jun. 29, 2006

(30) Foreign Application Priority Data

Jun. 24, 2003 (JP) ............................. 2003-179774

(51) Int. Cl.
| | |
|---|---|
| B32B 7/00 | (2006.01) |
| B32B 27/32 | (2006.01) |
| B32B 27/30 | (2006.01) |
| B32B 27/36 | (2006.01) |
| B32B 37/16 | (2006.01) |

(52) U.S. Cl. ................. 428/212; 428/213; 428/214; 428/216; 428/339; 428/480; 428/483; 428/500; 428/522; 428/523

(58) Field of Classification Search ........................ None
See application file for complete search history.

(56) References Cited

U.S. PATENT DOCUMENTS

| | | | | | |
|---|---|---|---|---|---|
| 4,457,798 | A | * | 7/1984 | Hoppe et al. ................. 156/248 |
| 4,469,353 | A | * | 9/1984 | Anarwala ..................... 283/74 |
| 4,754,319 | A | * | 6/1988 | Saito et al. ................... 257/679 |
| 4,889,749 | A | * | 12/1989 | Ohashi et al. ................. 428/13 |
| 5,171,625 | A | * | 12/1992 | Newton .................... 428/195.1 |
| 5,264,410 | A | * | 11/1993 | Beck et al. .................. 503/227 |
| 5,438,928 | A | * | 8/1995 | Chatwin et al. ............. 101/369 |
| 5,466,535 | A | * | 11/1995 | Higgins et al. .............. 428/483 |
| 5,759,756 | A | * | 6/1998 | Laney et al. ................. 430/527 |
| 5,814,393 | A | * | 9/1998 | Miyaake et al. ............. 428/209 |
| 5,928,788 | A | * | 7/1999 | Riedl ...................... 428/411.1 |
| 6,333,113 | B2 | * | 12/2001 | Sugie et al. ................. 428/412 |
| 6,333,133 | B1 | * | 12/2001 | Nakamura et al. ........ 430/270.1 |
| 6,644,552 | B1 | * | 11/2003 | Herslow ..................... 235/488 |
| 6,843,422 | B2 | * | 1/2005 | Jones et al. ................. 235/492 |
| 6,848,622 | B2 | * | 2/2005 | Kudo et al. ................. 235/492 |
| 6,942,156 | B2 | * | 9/2005 | Ohta et al. .................. 235/492 |
| 7,097,726 | B2 | * | 8/2006 | Hattori et al. ............... 156/230 |
| 7,131,594 | B2 | * | 11/2006 | Ohta et al. .................. 235/492 |
| 2003/0062420 | A1 | * | 4/2003 | Ohta et al. .................. 235/492 |
| 2004/0159709 | A1 | * | 8/2004 | Ohta et al. .................. 235/492 |
| 2006/0073312 | A1 | * | 4/2006 | Hattori .................... 428/195.1 |

FOREIGN PATENT DOCUMENTS

| | | | |
|---|---|---|---|
| EP | 1 547 806 | * | 5/2005 |
| JP | 50-145480 | * | 11/1975 |
| JP | 05-116242 | | 5/1993 |
| JP | 10-100356 | | 4/1998 |
| JP | 10-203061 | * | 8/1998 |
| JP | 10-211784 | | 8/1998 |
| JP | 11-189708 | | 7/1999 |
| JP | 11-254578 | | 9/1999 |
| JP | 2000-137782 | | 5/2000 |
| JP | 2000-242760 | | 9/2000 |
| JP | 2001-319210 | | 11/2001 |
| JP | 2002-331633 | | 11/2002 |
| JP | 2003-191422 | | 7/2003 |
| WO | WO 03/022574 | * | 3/2003 |
| WO | WO 2004/003929 | * | 4/2004 |

* cited by examiner

*Primary Examiner*—Vivian Chen
(74) *Attorney, Agent, or Firm*—Sonnenschein Nath & Rosenthal LLP

(57) ABSTRACT

A synthetic resin card in which card warpage can be reduced and a method for producing the same are provided. By setting the difference Δ in the angle of orientation between outer layers symmetrically laminated on a card core section, it is possible to reduce imbalance of stress resulting from the difference in the shrinkage factor between the outer layers, and card warpage can be suppressed. Furthermore, by setting the thickness of the outer layers at 25 μm to 125 μm, rising of the surface of the synthetic resin card can be reduced. By reducing the card warpage and the rising of the surface of the synthetic resin card, it is possible to improve moving characteristics when the synthetic resin card is allowed to move in a device.

15 Claims, 2 Drawing Sheets

SYNTHETIC RESIN CARD AND METHOD OF PRODUCING THE SAME

TECHNICAL FIELD

The present invention relates to a synthetic resin card in which card warpage after pressing is reduced and which has excellent durability, and a method for producing the same.

BACKGROUND ART

Magnetic recording mediums have been conventionally widely used in the field of cash cards, credit cards, ID cards, and the like. In magnetic recoding mediums, simple information, such as names of card owners and membership numbers, can be magnetically recorded, and identification of the card owners, etc. is performed on the basis of such information. However, in the magnetic recording mediums, the amount of information that can be recorded is limited. Furthermore, since magnetically recorded information can be easily read, there remains a concern with respect to security.

Recently, in view of prevention of leakage of personal information, there has been a demand for tightening security. IC cards including IC chips as recording mediums have been receiving attention for the sake of higher security and becoming mainstream. In particular, non-contact IC cards have been widely used in boarding systems, security systems, and the like, and widespread use of such IC cards is remarkable.

These cards are usually produced by thermal pressing of synthetic resins, such as plastics. When oriented PET substrates are vertically symmetrically placed and laminated on front and back surfaces of a core layer composed of a plurality of sheets interposed inside a card, in some cases, warpage may occur in the card after lamination with a press, giving rise to problems.

Such card warpage causes various defects. For example, moving characteristics may be affected by the warpage of the card when an initializer, a printer, or the like is used. It may become impossible to read information recorded in IC chips and magnetic stripes and to write information in these recording mediums. Furthermore, when a card is left to stand in high temperatures, the shape of an IC chip, etc. contained in the card may stand out, and as a result, moving characteristics may be affected when an initializer, a printer, or the like is used, as in the case of the card warpage described above. Consequently, there has been a need for a card in which card warpage due to thermal pressing is suppressed and degradation of the surface of the card is small, and which has excellent durability.

Accordingly, it is an object of the present invention to provide a synthetic resin card in which moving characteristics are improved when an initializer, a printer, or the like is used, and card warpage after pressing is reduced so that reading and writing from and in an IC chip, a magnetic stripe, or the like formed in the card can be performed satisfactorily, and which has excellent durability, and a method for producing such a synthetic resin card.

DISCLOSURE OF INVENTION

A synthetic resin card according to the present invention includes a substantially planar core layer, and a first outer layer and a second outer layer laminated on front and back surfaces of the core layer, respectively, wherein the difference $\Delta$ in the angle of orientation between the first and second outer layers is 20° or less. In such a synthetic resin card, it is possible to reduce imbalance of stress resulting from the difference in the shrinkage factor between the outer layers disposed on the front and back surfaces of the core layer, card warpage does not substantially occur, and the card has excellent moving characteristics. Furthermore, the thicknesses of the first and second outer layers may be symmetrical with respect to the core layer. The symmetry in thickness further reduces imbalance of stress, and the card warpage can be further reduced.

In the synthetic resin card of the present invention, the first and second outer layers may each have a thickness of 25 to 125 μm. In such a thickness range, the imbalance of stress applied to the synthetic resin card can be reduced. Consequently, the card warpage can be controlled within the specified range according to the standard. Furthermore, in the synthetic resin card of the present invention, even if a biaxially oriented film, such as oriented PET, is used for the first and second outer layers, card warpage can be reduced. Furthermore, since the core layer and the first and second outer layers can be formed of halogen-free materials, environmental considerations are also made.

Furthermore, in the synthetic resin card of the present invention, the core layer may include an electronic module sandwiched between a pair of core components. In the synthetic resin card having such a structure, the electronic module provided in the core layer can impart various functions to the synthetic resin card. Moreover, if the electronic module is composed of an IC chip and an IC module connected to the IC chip, the synthetic resin card can be an IC card.

Furthermore, in the synthetic resin card of the present invention, at least one of the first outer layer and the second outer layer may be provided with a recording layer. By forming the recording layer using a reversible thermosensitive material, it is also possible to form a rewritable card in which data can be recorded and deleted at will.

Furthermore, in the synthetic resin card of the present invention, the core layer may be composed of a copolymer of terephthalic acid, cyclohexanedimethanol, and ethylene glycol, and polycarbonate, the compounding ratio of the copolymer being 70% or less. In such a core layer, molding can be easily performed, and the core layer has excellent heat resistance and excellent durability when used for a long period of time. For example, even when the core layer contains an IC chip and an IC module, it is possible to prevent the shape thereof from standing out in the surface of the card. Therefore, it is possible to provide a synthetic resin card in which the surface of the card is planar even when the synthetic card is used in various environments, and data can be repeatedly and reliably recorded and deleted in and from the synthetic resin card.

A method for producing a synthetic resin card according to the present invention includes laminating a first outer layer and a second outer layer on front and back surfaces of a core layer, wherein the first and second outer layers are selected so that the difference $\Delta$ in the angle of orientation between the first and second outer layers is 20° or less, and the first and second outer layers are laminated so that the thicknesses of the first and second outer layers are symmetrical with respect to the core layer. In such a method for producing a synthetic resin card, it is possible to reduce imbalance of stress resulting from the difference in the shrinkage factor between the outer layers disposed on the front and back surfaces of the core layer, and it is possible to produce a synthetic resin card in which card warpage does not substantially occur.

BEST MODE FOR CARRYING OUT THE INVENTION

A synthetic resin card and a method for producing the same according to the present invention will be described with reference to FIGS. 1 and 2. The synthetic resin card of the present invention relates to a synthetic resin card, for example, used for a magnetic card, an embossed card, a contact type IC card, a non-contact type IC card, or a card to which the functions of these cards are imparted. In this embodiment, as an example of the synthetic resin card, an IC card provided with an electronic module, such as an IC module, will be described. Note that the synthetic resin card of the present invention is not limited to this embodiment as long as it is within the scope of the present invention, and is applicable to any card.

Figure 1:
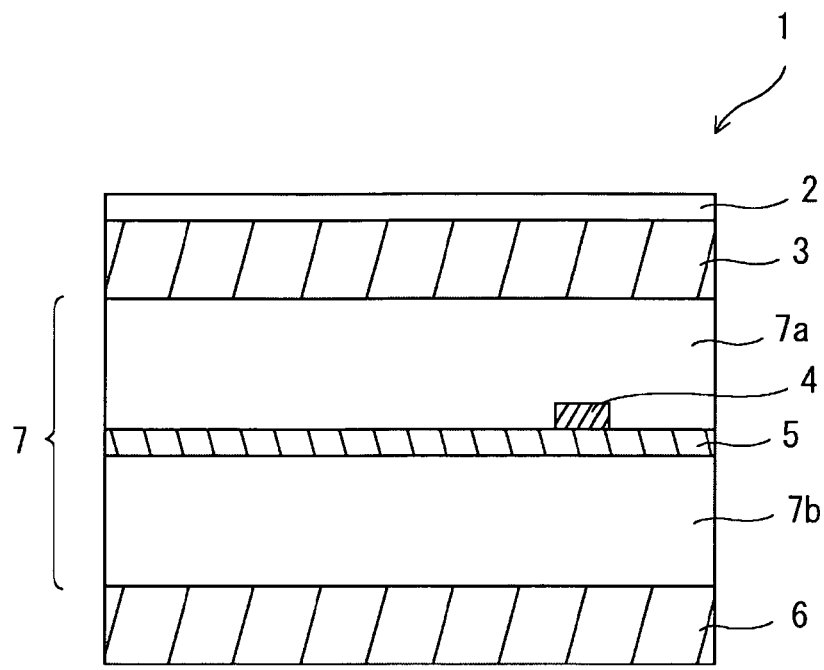
FIG. 1 is a structure diagram which shows a structure of an IC card as an example of a synthetic resin card according to the present invention.
Figure 2:
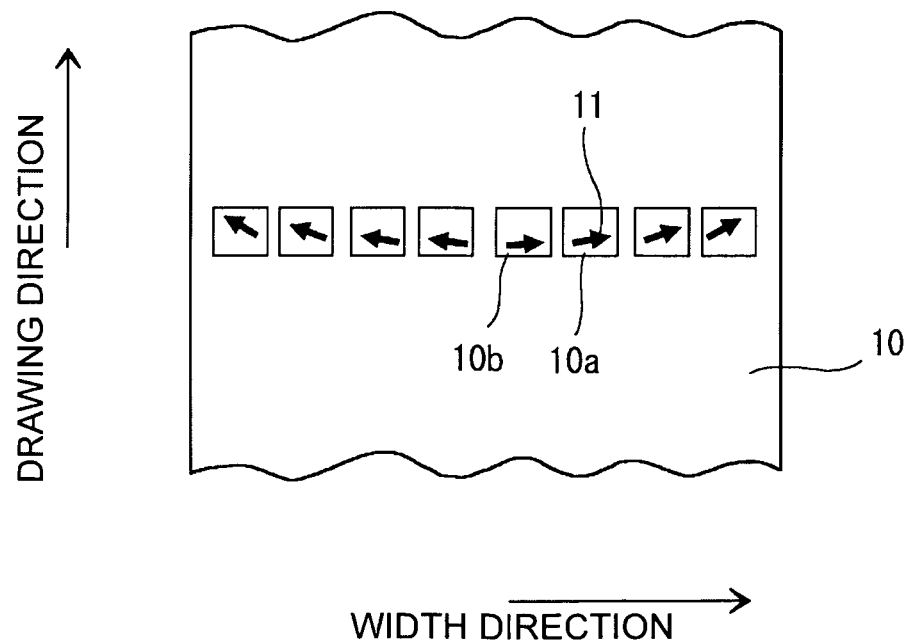
FIG. 2 is a diagram which schematically shows molecular orientation in an original film from which outer layer sheets are cut out.

FIG. 1 is a diagram showing an example of an IC card according to this embodiment and is a structure diagram showing a structure of an IC card 1. FIG. 2 is a diagram which schematically shows molecular orientation in an original film from which outer layer sheets 3 and 6 are cut out.

The IC card 1 includes a card core section 7 serving as a core layer in which an IC chip 4 and an IC module 5 connected to the IC chip 4 are sandwiched between card core sheets 7a and 7b, outer layer sheets 3 and 6 bonded to the upper surface and the lower surface of the card core section 7, respectively, and a reversible recording layer 2 disposed on the upper surface of the outer layer sheet 3.

The outer layer sheets 3 and 6 are outer layers laminated to the upper surface and the lower surface of the card core section 7 and are symmetrically bonded to the card core section 7. The outer layer sheets 3 and 6 are sheets which have molecular orientation, and a biaxially oriented film formed by drawing can be used for each sheet. Examples of the biaxially oriented film include polyethylene terephthalate (PET), polyethylene naphthalate (PEN), polypropylene (PP), polyphenylene sulfide (PPS), polystyrene, polyamides, polyvinyl chloride, and polyvinylidene chloride. In particular, PET, PEN, PP, PPS, polystyrene, and polyamides are preferable as environmentally-friendly materials because a halogen, such as chlorine, is not contained.

Furthermore, the difference in the angle of orientation between the outer layer sheets 3 and 6 is set at 20° or less. With respect to the biaxially oriented film used for the outer layer sheets 3 and 6 in this embodiment, the shrinkage factor in the drawing direction of the sheet and the shrinkage factor in a direction perpendicular to the drawing direction of the sheet are different during the formation of the biaxially oriented film. Consequently, when the outer layer sheets 3 and 6 are bonded to the card core section 7 by thermal pressing, stress is applied to the card core section 7. Such stress causes warpage of the IC card 1 after thermal pressing. Therefore, the difference in the angle of orientation between the outer layer sheets 3 and 6 is set at 20° or less. By using the outer layer sheets 3 and 6 to be bonded in which the difference in the angle of orientation is within such a range, it is possible to suppress the nonuniformity of stress applied from these outer layer sheets 3 and 6 to the card core section 7. Furthermore, since the outer layer sheets 3 and 6 are symmetrically bonded to the card core section 7, it is possible to suppress the imbalance of stress applied from the outer layer sheets 3 and 6 to the card core section 7, and thus card warpage does not substantially occur in the IC card 1 after thermal pressing.

The outer layer sheets 3 and 6 are cut out with a predetermined size from an original film formed by drawing. As shown in FIG. 2, deviation occurs in molecular orientation 11 in the plane of an original film 11 along the width direction which is perpendicular to the drawing direction of the original film 10. The direction of the molecular orientation 11 has a tendency to become closer to the drawing direction from the center toward the ends with respect to the width direction of the original film 10. Consequently, as the outer layer sheets 3 and 6, sheets that are cut out by selecting certain regions of the original film 10 such that the difference in the angle of orientation between the sheets is 20° or less. For example, in FIG. 2, if outer layer sheets cut out from a region 10a and its adjacent region 10b, respectively, are used as the outer layer sheets 3 and 6, it is possible to set the difference in the angle of orientation between the outer layer sheets 3 and 6 at 20° or less. Furthermore, it is also possible to stack sheets from regions adjacent to each other in the drawing direction of the original film 10, i.e., sheets in the same line along the drawing direction.

The card core section 7 corresponds to a core layer of the IC card 1 and includes core sheets 7a and 7b which sandwich an IC chip 4 and an IC module 5. The core sheets 7a and 7b are core components constituting the core layer of the IC card 1 and are, for example, composed of PET-G, i.e., a copolymer of terephthalic acid, cyclohexanedimethanol, and ethylene glycol. Since PET-G becomes flowable when heated, molding can be easily performed. Moreover, in view of excellent heat resistance and durability, PET-G is considered to be suitable as a material constituting synthetic resin cards, such as IC cards. Furthermore, the core sheets 7a and 7b may be composed of a material prepared by compounding polycarbonate (PC) with PET-G. While making use of advantages in the molding of the card, IC card 1 can be formed so as to have excellent heat resistance and durability.

Furthermore, the core sheets 7a and 7b may be formed using a mixture of a polycarbonate resin and a copolymerized polyester resin prepared by replacing 10% to 70% of an ethylene glycol component with cyclohexanedimethanol in polyethylene terephthalate. The core sheets 7a and 7b formed using such a material have excellent heat resistance and are suitable for use in the application that may be exposed to high temperatures. Moreover, the design and the like printed on the surfaces of the core sheets 7a and 7a do not substantially discolor, and high quality is achieved. In general, as the amount of PC compounded is increased, burr is reduced. If the amount of PET-G is increased, burr tends to occur.

The reversible recording layer 2 is a recording layer in which data can be recorded and deleted at will, and for example, is formed by the application of a reversible thermosensitive material. A reversible recording layer 2 that is composed of a reversible thermosensitive material is also a reversible display layer in which various types of information can be displayed by color development and color extinction with heat. For example, such a reversible recording layer is suitable for use in rewritable cards which are widely used at present. Furthermore, the IC card 1 is not limited to the reversible recording layer 2 described above, and the IC card 1 can be provided with a magnetic recording layer or any of various other recording layers, such as an IC chip, which will be described below.

EXAMPLES

Experiments carried out with respect to IC cards according to this embodiment will now be described with reference to Table 1. First, samples used in Experimental Examples 1 to 17 will be described, and then evaluation items and evaluation results, and further, evaluation results will be described.

<Samples>

Samples used in Experimental Examples 1 to 17 basically have substantially the same structure as that of the IC card 1 described above.

With respect to a sample used in Experimental Example 1, core sheets (sheet thickness: 250 μm) were each temporarily fixed by welding four corners using an ultrasonic welding device so as to be vertically symmetrical to form a card core section, and oriented PET substrates (thickness: 100 μm) were temporarily fixed on the upper and lower surfaces of the card core section so as to be vertically symmetrical with respect to the card core section and so that there was no difference in the angle of orientation. Furthermore, using a vacuum heat melting press (manufactured by Kitagawa Seiki Co., Ltd.), press bonding and heat melting were performed at a temperature of 140° C. and a press pressure of 10 Kgf/cm$^2$, followed by cooling and solidification. The resulting molded object was cut out in the shape of a card to produce a card. Note that the card in Experimental Example 1 had a structure that did not include an IC chip. Furthermore, the type of the material constituting the core sheets was a mixture of polycarbonate (PC) and a copolymer (PET-G) of cyclohexanedimethanol and ethylene glycol in which a white filler (TiO$_2$) was mixed, the compounding ratio of PET-G being 50%.

A sample used in Experimental Example 2 had substantially the same structure as that of the sample used in Experimental Example 1, but an IC module was interposed between the core sheets constituting the card core section. Note that the IC module was disposed vertically symmetrically with respect to the thickness direction of the card, and a non-contact type IC module including an IC chip connected to a thin-film coil was used.

A sample used in Experimental Example 3 had substantially the same structure as that of the sample used in Experimental Example 2, but a reversible recording layer, as an outer layer of the card, was disposed on the upper surface of one of the oriented PET substrates. As the reversible recording layer, a Leuco color development rewrite sheet manufactured by Mitsubishi Paper Mills Limited in which a recording layer was composed of a reversible thermosensitive material was used. The Leuco color development rewrite sheet included a PET substrate (thickness: 25 μm), and a recording layer (thickness: 7 μm) and a protective layer (thickness: 3 μm) for protecting the recording layer disposed in that order on the PET substrate.

Samples used in Experimental Examples 4 to 6 had substantially the same structure as that of the sample used in Experimental Example 3, but the difference in the angle of orientation between the oriented PET substrates bonded on the upper and lower surfaces of the card core section was set at 4°, 10°, and 20°, respectively.

Samples used in Experimental Examples 7 and 8 had substantially the same structure as that of the sample used in Experimental Example 3, but the thickness of the oriented PET substrate as the outer layer was changed to 125 μm and 25 μm, respectively.

Samples used in Experimental Examples 9 and 10 had substantially the same structure as that of the sample used in Experimental Example 3, but the compounding ratio between PET-G and PC was changed with respect to the material for the core sheets constituting the card core section. Specifically, in the sample used in Experimental Example 9, the compounding ratio of PET-G was set at 70%, and in the sample used in Experimental Example 10, the compounding ratio of PET-G was set at 0%.

A sample used in Experimental Example 11 had substantially the same structure as that of the sample used in Experimental Example 3, but the card core section was formed using vinyl chloride.

Samples used in Experimental Examples 12 and 13 had substantially the same structure as that of the sample used in Experimental Example 3, but the difference Δ in the angle of orientation between the oriented PET substrates bonded on the upper and lower surfaces of the card core section was set at 25° and 90°, respectively.

Samples used in Experimental Examples 14 and 15 had substantially the same structure as that of the sample used in Experimental Example 3, but the thickness of the oriented PET substrate was set at 150 μm and 12 μm, respectively.

Samples used in Experimental Examples 16 and 17 had substantially the same structure as that of the sample used in Experimental Example 3, but, with respect to PET-G and PC constituting the card core section, the compounding ratio of PET-G was set at 80% and 100%, respectively.

<Evaluation Items and Evaluation Methods>

The evaluation items and evaluation methods in experiments carried out in this example will now be described below.

1) Difference in Angle of Orientation

The angles of orientation of oriented PET substrates bonded to the upper and lower surfaces of the card core section of the card to be evaluated in each Experimental Example were measured and the difference (Δ°) was calculated. In measuring the angle of orientation, a molecular orientation analyzer (trade name: Model MOA-2001A, manufactured by Oji Scientific Instruments) was used.

2) Total Thickness of Card

With respect to the card used as the sample in each Experimental Example, the total thickness of the card was measured according to the ISO standard using a micrometer (trade name: μ-mate, manufactured by Sony Corporation). In Table 1, a total thickness of the card in a range of 680 to 840 μm was evaluated as good (indicated by ○ in Table 1), and a total thickness of the card out of the range was evaluated as defective (indicated by × in Table 1).

3) Card Warpage

Figure 3:
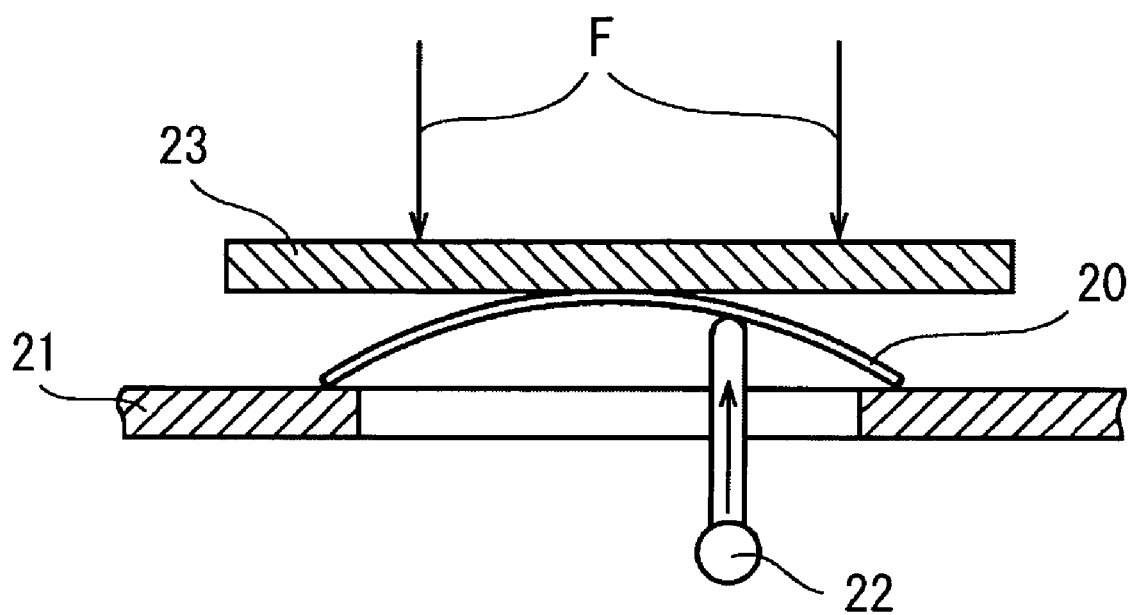
FIG. 3 is a drawing illustrating a method for measuring card warpage.

With respect to the card produced by thermal pressing in each Experimental Example, card warpage after thermal pressing was measured according to JISX6305. As shown in FIG. 3, in measuring card warpage, a card 20 was placed on a platen 21, and while a dial gauge 22 was being allowed to abut against one surface of the card, a substantially planar press device 23 was brought into contact with the opposite surface of the card 20. A load F of 2.2 N was substantially uniformly applied to the entire card 20 and the card 20 was left to stand for one minute. Then, card warpage was measured. Note that the card warpage of the card 20 is defined as a length from the surface of the platen 21 to the maximum height of the card 20 placed on the platen and includes the thickness of the card 20 to be measured. The standard of the card warpage is 1.5 mm or less.

4) Moving Characteristics

Moving characteristics were evaluated when a card sample was allowed to move in a device for recording or deleting data. With respect to the card evaluated in each Experimental Example, a moving test was carried out using a thermal recording printer (manufactured by Panasonic Communications Co., Ltd.). When a card moved without any problem, the card was evaluated as good (indicated by ○ in Table 1). When a card was unable to move, the card was evaluated as defective (indicated by × in Table 1).

5) Generation of Halogen Gas

The card used in each Experimental Example was burned. A card which did not generate halogen gas was evaluated as good (indicated by ○ in Table 1). A card which generated halogen gas was evaluated as defective (indicated by × in Table 1).

6) Transport Characteristics in Card Production Process

Transport characteristics of the substrates used in producing the card in each experimental example was evaluated. In Table 1, that had good transport characteristics is indicated by ○, and that had insufficient transport characteristics is indicated by ×.

7) Moving Characteristics in Printer after High-temperature Storage

The card evaluated in each Experimental Example was left to stand in a thermostatic chamber controlled at a temperature of 70° C. and a humidity of 60% for 72 hours. With respect to the card thus left to stand, moving characteristics were evaluated using the thermal recording printer described above. In Table 1, that had good moving characteristics is indicated by ○, and that had insufficient moving characteristics is indicated by ×.

<Evaluation Results>

Evaluation results with respect to Experimental Examples 1 to 17 are shown in Table 1.

standard, i.e., 1.5 mm or less. Consequently, it has been confirmed that in order to suppress card warpage, it is effective to set the difference in the angle of orientation between the oriented PET substrates which are outer layers at 20° or less. Furthermore, when Experimental Examples 3, 7, 8, 14, and 15 were compared, with respect to the evaluation items of the moving characteristics of the card and the total thickness of the card, the case in which the thickness of the oriented PET substrate which is the outer layer is in a range of 25 μm to 125 μm has satisfactory evaluation results. Consequently, with respect to Experimental Examples 1 to 17, the cards used in Experimental Examples 1 to 10 have satisfactory results in all the evaluation items of the total thickness of the card, card warpage, generation of halogen gas during burning, moving characteristics, transport characteristics, and moving characteristics after being left under high temperatures. That is, it has been confirmed that by setting the difference in the angle of orientation between the oriented PET substrates which are bonded with thicknesses being symmetrical with respect to the card core section at 20° or less and by setting the thickness of the oriented PET substrates at 25 μm to 125 μm, card warpage can be suppressed and rising of the surface of the card can be reduced. Furthermore, at the angle of orientation in a range of 0 to 4°, the card warpage is within the standard, and the card warpage is constant at 0.8 mm. Consequently, in order to stably reduce the card warpage, the angle of orientation in a range of 0 to 4° is believed to be more desirable.

As described above, by setting the difference in the angle of orientation between the outer layers symmetrically formed with respect to the card core section of the synthetic resin card, it is possible to reduce the card warpage of the synthetic resin card after thermal pressing. Consequently, defects during moving the synthetic resin card in an initializer, a printer or the like can be reduced, and writing and reading in and from the synthetic resin card can be performed smoothly. Furthermore, by setting the difference in the angle of orientation between the outer layers at 20° or less and setting the

TABLE 1

| | Difference in angle of orientation (Δ°) | Thickness of PET (μm) | Card core layer Type | Card core layer Compounding ratio | Total thickness of card (μm) | Card warpage (mm) | Generation of halogen gas during burning | Moving characteristics | Transport characteristics | Moving characteristics after high-temperature storage |
|---|---|---|---|---|---|---|---|---|---|---|
| Example 1 | 0 | 100 | PET-G/PC | 5:5 | ○ | 0.8 | None | ○ | ○ | ○ |
| Example 2 | 0 | 100 | PET-G/PC | 5:5 | ○ | 0.8 | None | ○ | ○ | ○ |
| Example 3 | 0 | 100 | PET-G/PC | 5:5 | ○ | 0.8 | None | ○ | ○ | ○ |
| Example 4 | 4 | 100 | PET-G/PC | 5:5 | ○ | 0.8 | None | ○ | ○ | ○ |
| Example 5 | 10 | 100 | PET-G/PC | 5:5 | ○ | 1.25 | None | ○ | ○ | ○ |
| Example 6 | 20 | 100 | PET-G/PC | 5:5 | ○ | 1.5 | None | ○ | ○ | ○ |
| Example 7 | 0 | 125 | PET-G/PC | 5:5 | ○ | 0.8 | None | ○ | ○ | ○ |
| Example 8 | 0 | 25 | PET-G/PC | 5:5 | ○ | 0.8 | None | ○ | ○ | ○ |
| Example 9 | 0 | 100 | PET-G/PC | 7:3 | ○ | 0.8 | None | ○ | ○ | ○ |
| Example 10 | 0 | 100 | PET-G/PC | 0:10 | ○ | 0.8 | None | ○ | ○ | ○ |
| Example 11 | 0 | 100 | Vinyl chloride | — | ○ | 0.8 | Observed | ○ | ○ | ○ |
| Example 12 | 25 | 100 | PET-G/PC | 5:5 | ○ | 1.9 | None | × | ○ | ○ |
| Example 13 | 90 | 100 | PET-G/PC | 5:5 | ○ | 4 | None | × | ○ | ○ |
| Example 14 | 0 | 150 | PET-G/PC | 5:5 | × | 0.8 | None | × | ○ | ○ |
| Example 15 | 0 | 12 | PET-G/PC | 5:5 | ○ | 0.8 | None | ○ | × | ○ |
| Example 16 | 0 | 100 | PET-G/PC | 8:2 | ○ | 0.8 | None | ○ | ○ | × |
| Example 17 | 0 | 100 | PET-G/PC | 10:0 | ○ | 0.8 | None | ○ | ○ | × |

As shown in Table 1, when Experimental Examples 3 to 6, 12, and 13 are compared, in Experimental Examples 3 to 6 in which the difference in the angle of orientation between the oriented PET substrates which are outer layers bonded to the upper and lower surfaces of the card core section is 20° or less, the card warpage is 1.5 mm or less, thus satisfying the thickness of the outer layers at 25 μm to 125 μm, the card warpage can be suppressed to a value below the standard value (1.5 mm) stipulated in JIS, and rising of the surface of the synthetic resin card can be reduced. Thereby, it is possible to provide a synthetic resin card having more satisfactory moving characteristics.

The invention claimed is:

1. A synthetic resin card comprising:
   a substantially planar core section; and
   a first outer layer and a second outer layer laminated on front and back surfaces of the core section, respectively,
   wherein,
   the first outer layer and the second outer layer have molecular orientations,
   the first outer layer and the second outer layer are adhered directly to the front and back surfaces of the core section by means of a thermal pressing and are symmetrically bonded to the core section, and
   the difference $\Delta$ in the angle of orientation between the molecular orientations of the first and second outer layers is 20° or less causing the synthetic resin card warpage to be 1.5 mm or less, and at least one of the first and second outer layers is provided with a recording layer.

2. The synthetic resin card according to claim 1, wherein,
   the thicknesses of the first and second outer layers are symmetrical with respect to the core section.

3. The synthetic resin card according to claim 1, wherein,
   the first and second outer layers each have a thickness of 25 to 125 µm.

4. The synthetic resin card according to claim 1, wherein,
   the first and second outer layers are each formed of a biaxially oriented film.

5. The synthetic resin card according to claim 4, wherein,
   the biaxially oriented film comprises an oriented PET material.

6. The synthetic resin card according to claim 1, wherein,
   the core section comprises a first core layer and a second core layer between which is sandwiched an electric module.

7. The synthetic resin card according to claim 6, wherein,
   the first and second outer layers comprise films selected from the group consisting of polyethylene terephthalate (PET), polyethylene naphthalate (PEN), polypropylene (PP), polyphenylene sulfide (PPS), polystyrene, polyamides, polyvinyl chloride (PVC) and polyvinylidene chloride.

8. The synthetic resin card according to claim 1, wherein,
   the recording layer is composed of a reversible thermosensitive material.

9. The synthetic resin card according to claim 1, wherein,
   the core section is composed of a copolymer of terephthalic acid, cyclohexanedimethanol, and ethylene glycol, and polycarbonate, the compounding ratio of the copolymer being 70% or less.

10. The synthetic resin card according to claim 1, wherein,
    the core section and the first and second outer layers are each composed of a halogen-free material.

11. The synthetic resin card of claim 1, wherein,
    the core section is made of a material selected from the group consisting of a copolymer of terephthalic acid, cyclohexanedimethanol, and ethylene glycol; and a mixture of a polycarbonate resin and a copolymerized polyester resin prepared by replacing 10% to 70% of an ethylene glycol component with cyclohexanedimethanol in polyethylene terephthalate.

12. A method for producing a synthetic resin card comprising the steps of:
    laminating a first outer layer with a first molecular orientation and a second outer layer with a second molecular orientation on front and back surfaces of a substantially planar core section, respectively, by means of thermal pressing process so that said front and second outer layers are directly adhered to said planar core section, and
    forming at least one recording layer on at least one of the first outer layer and the second outer layer,
    wherein,
    the first and second outer layers are selected so that the difference $\Delta$ in the angle of orientation between the molecular orientations of the first and second outer layers is 20° or less so that the synthetic resin card warpage is 1.5 mm or less; and
    the first and second outer layers are laminated so that the thicknesses of the first and second outer layers are symmetrical with respect to the core section.

13. The method according to claim 12, wherein,
    the first and second outer layers are each biaxially oriented films.

14. The method according to claim 13, wherein,
    the first and second outer layers are comprising of a material selected from the group consisting of polyethylene terephthalate (PET), polyethylene naphthalate (PEN), polypropylene (PP), polyphenylene sulfide (PPS), polystyrene, polyamides, polyvinyl chloride (PVC) and polyvinylidene chloride.

15. The method of claim 12, wherein,
    the core section is made of a material selected from the group consisting of a copolymer of terephthalic acid, cyclohexanedimethanol, and ethylene glycol; and a mixture of a polycarbonate resin and a copolymerized polyester resin prepared by replacing 10% to 70% of an ethylene glycol component with cyclohexanedimethanol in polyethylene terephthalate.

* * * * *